United States Patent [19]

Roda et al.

[11] 4,343,933
[45] Aug. 10, 1982

[54] PROCESS FOR THE ANIONIC POLYMERIZATION OF 2-PYRROLIDONE WITH FAST FREEZING STEP

[75] Inventors: Jan Roda; Jaroslav Králíček, both of Prague, Czechoslovakia

[73] Assignee: Vysoka skola chemicko-technologicka, Prague, Czechoslovakia

[21] Appl. No.: 191,147

[22] Filed: Sep. 26, 1980

[30] Foreign Application Priority Data

Dec. 5, 1979 [CS] Czechoslovakia .................... 8446-79

[51] Int. Cl.$^3$ ............................................. C08G 69/24
[52] U.S. Cl. .................................... 528/312; 528/315; 528/326; 526/65; 526/61
[58] Field of Search ...................... 528/326, 312, 315

[56] References Cited

U.S. PATENT DOCUMENTS 3,879,354 4/1975 Bonner ................................. 528/326

*Primary Examiner*—Harold D. Anderson

[57] ABSTRACT

Process which accelerates the activated and non-activated polymerization of 2-pyrrolidone. A prepared polymerization charge containing monomer and components of the initiation system is first allowed to polymerize at a temperature above the monomer melting temperature, then is cooled below the melting point of the mixture, and then the crystalline reaction mixture is heated to a polymerization temperature of 25° to 60° C.

5 Claims, No Drawings

PROCESS FOR THE ANIONIC POLYMERIZATION OF 2-PYRROLIDONE WITH FAST FREEZING STEP

The invention relates to a process for the anionic polymerization of 2-pyrrolidone activated with carbon dioxide or, if desired, with alkali carboxylate of 2-pyrrolidone and initiated by alkali or ammonium salt of 2-pyrrolidone in bulk polymerization or in the presence of inert liquids not dissolving either monomer or polymer.

Anionic polymerization of 2-pyrrolidone activated by fast activators of the

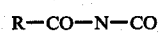

type takes place in two kinetically and phase different stages.

In the initial homogeneous stage, when the rate of propagation exceeds in order of magnitude the rate of formation of crystallization centers (followed by polymer crystallization) a 10 to 40% conversion of the monomer to polymer is reached within a few minutes (depending on the type and concentration of initiation system), but the polymer is of relatively low molecular weight and thus unsuitable for application in fiber industry. The polymerization has to be led further for tens of hours in a subsequent heterogeneous stage in order to reach economically acceptable polymer yield having suitable molecular weight. Two processes are competitive in this phase, polymer crystallization, and growth of polymer chain.

On the other hand, anionic polymerization of 2-pyrrolidone in the presence of carbon dioxide or, if desired, alkali caboxylate of 2-pyrrolidone as an activator, follows a different course. It has been proved that by the reaction between the alkali salt of 2-pyrrolidone and carbon dioxide alkaline carboxylate of 2-pyrrolidone is formed, a compound of ionic character and of imide structure as well, and which is minimally soluble in a mixture of 2-pyrrolidone and its alkali salt. Polymerization of 2-pyrrolidone in the presence of carbon dioxide thus has from the beginning a heterogeneous character without a homogeneous phase. It is known that conversion increases linearly with time at the beginning of the process. Up to a 25% conversion is reached within 10 to 15 hours under optimum conditions; the molecular weight is already high at the beginning, and reaches a minimum value $[\eta] = 500 \text{ cm}^3\text{g}^{-1}$.

As the number of polymer molecules (N PM) expressed $\text{N PM} = (\%) 10^{-2} \text{Mw}^{-1}$ increases linearly with polymerization time and with conversion, either growth centers are always being ever formed in the system on the account of solubility of alkali carboxylate, or it is possible polymerization of 2-pyrrolidone can be viewed as being like non-activated polymerization controlled by the presence of carboxylate. The content of growing polymerization chains is lowered by up to an order of magnitude related to activated and also to non-activated polymerization. The probability for side reactions, mainly condensations, to take place has to be lowered by this, and the thermal stability of the polypyrrolidone formed has to be thus positively affected, as has been observed.

For the same reasons, that is, because of the low content of active growth centers, the polymerization rate is lower than with other, activated processes.

The rate of anionic polymerization of 2-pyrrolidone can be partially affected by the choice of the reaction conditions and by properly chosen composition of the initiation system.

Lately there has been found a process for the acceleration of activated and non-activated polymerization of 2-pyrrolidone. In such processes the prepared polymerization charge containing monomer and components of the initiation system is cooled below the melting point of the mixture, and then the crystalline reaction mixture is heated to the polymerization temperature of 25° to 60° C.

The process of the invention improves the process for the anionic polymerization of 2-pyrrolidone activated by carbon dioxide or, if desired, with alkaline carboxylate of 2-pyrrolidone and initiated with alkali or ammonium salt of 2-pyrrolidone in block arrangement or in the presence of inert liquids not dissolving either monomer or polymer. In accordance with the present invention, the polymerization mixture formed by a monomer and an initiation system, and by an inert liquid if desired, is at first allowed to polymerize for 1 to 100 minutes above the monomer melting point, at a temperature of 25° to 70° C., then the polymerization mixture is quickly cooled to a temperature of −50° to −190° C., and after 1 to $10^3$ minutes the mixture is allowed to polymerize at a temperature of 15° to 75° C. Under optimum conditions, that is, at a properly chosen time interval between the start of the polymerization and the fast freezing, polymer in up to a two-fold higher yield with higher molecular weight is obtained as compared with polymerization in an isothermal arrangement. The optimal time interval is determined by the polymerization temperature and the concentration and composition of the initiation system.

The polymerization process according to the invention provides improvement of polymer thermal stability, besides a reduction of the polymerization time with the conservation of all the important physical and chemical polymer parameters, and also provides the possibility of decreasing the concentration of the initiation system, all of which are advantageous especially from the point of view of polymer processing. The thermal stability is increased by approximately 10° C.

Further improvement in the properties of polypyrrolidone and the economics of the polymerization process are thus the advantages of the process according to the invention.

The invention and its effects are further elucidated in the following examples of preferred embodiments of the process.

EXAMPLE 1

Potassium salt of 2-pyrrolidone having a concentration of 5.6 molar % was prepared by distilling off methanol and 40 g of 2-pyrrolidone from a mixture of 150 g of 2-pyrrolidone and 12.4 g methanolic solution of potassium hydroxide of concentration 4.9 mole kg$^{-1}$ under an inert argon atmosphere at 85° C./12 Pa. Dry carbon dioxide at a rate of 200 cm$^3$/min was then introduced into the mixture of 2-pyrrolidone and its potassium salt at 90° C. From difference weighing the final concentration of potassium salt of 2-pyrrolidone-4.9 molar % and potassium carboxylate-0.7 molar % were determined. This polymerization charge was immediately dosed into glass ampoules having a diameter of approximately 8 mm; the ampoules were sealed under inert gas flow and were put into a bath heated to 45° C. After a chosen heating time Δt, as is further set forth in the table, the ampoules were put for 10 minutes into a solid carbon dioxide and ethanol mixture (−78° C.) and then were again heated to 45° C.; the total polymerization time was 20 hours.

| Sample designation | Δt (minutes) | Conversion (% by wt.) | Molecular Weight $[\eta]/cm^3g^{-1}/*/$ |
|---|---|---|---|
| 1 | 0 | 33.7 | 940 |
| 2 | 5 | 47.9 | 1247 |
| 3 | 10 | 52.5 | 1310 |
| 4 | 15 | 57.5 | 1220 |
| 5 | 20 | 57.6 | 1200 |
| 6 | 30 | 37.1 | 1070 |
| 7 | 45 | 34.4 | 989 |

*/ 25° C., m-cresol

The results summarized in the table indicate the necessity for the determination of optimum values of Δt for each composition of the initiation system.

Polymers prepared with freezing polymerization charge exhibit higher thermal stability as compared to polymers prepared without intermediate charge freezing.

EXAMPLE 2

A polymerization charge having a concentration of 4.9 molar % of potassium salt of 2-pyrrolidone and 0.9 molar % of potassium carboxylate was prepared in a manner to that in Example 1. Polymerization at 50° C. was quenched after time Δt=20 minutes by cooling the ampoule for 10 minutes at −198° C., (the same results were obtained at −50° C.). The ampoule was again heated to 50° C. The polymer yield was 78.4% after 45 hours of polymerization and its $[\eta]=1200$ cm$^3$g$^{-1}$-m-cresol at 25° C. A comparative polymer sample in isothermal arrangement had a conversion 56.7%. Analogous results with the process of the invention were achieved in the presence of heptane or other inert hydrocarbons not dissolving either 2-pyrrolidone or its polymer.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. A process for producing fiber forming poly 2-pyrrolidone by the anionic polymerization of 2-pyrrolidone monomer, comprising
   (1) forming a polymerization mixture of the monomer, anionic polymerization catalyst and carbon dioxide activator,
   (2) polymerizing said monomer at a temperature of 25° to 70° C. for 1 to 100 minutes,
   (3) quickly cooling the resulting polymerization mixtures to a temperature of −50° to −190° C. for 1 to 100 minutes,
   (4) thereafter completing the polymerization at a temperature of 15° to 75° C.

2. The process according to claim 1, wherein the polymerization is effected in the presence of carbon dioxide activator present as alkali carboxylate of 2-pyrrolidone.

3. The process according to claim 1, wherein the polymerization is bulk polymerization initiated by alkali salt of 2-pyrrolidone.

4. The process according to claim 1, wherein the polymerization is bulk polymerization initiated by ammonium salt of 2-pyrrolidone.

5. The process according to claim 1, wherein the polymerization is effected in the presence of an inert liquid not dissolving either monomer or polymer.

* * * * *